(12) United States Patent
Brunty et al.

(10) Patent No.: US 12,012,952 B2
(45) Date of Patent: Jun. 18, 2024

(54) ELECTRICALLY ACTUATED VALVES FOR MANIFOLD TRAILERS OR SKIDS

(71) Applicant: U.S. Well Services, LLC, Houston, TX (US)

(72) Inventors: Jeremy Brunty, Houston, TX (US); Jeremiah Luke Wright, Houston, TX (US); Alexander Christinzio, Houston, TX (US); Brandon Hinderliter, Houston, TX (US); Lon Robinson, Houston, TX (US); Jared Oehring, Houston, TX (US); Arden Albert, Houston, TX (US); Joshua Watson, Houston, TX (US)

(73) Assignee: U.S. Well Services, LLC, Houston, TX (US)

(*) Notice: Subject to any disclaimer, the term of this patent is extended or adjusted under 35 U.S.C. 154(b) by 479 days.

(21) Appl. No.: 17/091,926

(22) Filed: Nov. 6, 2020

(65) Prior Publication Data

US 2021/0148385 A1 May 20, 2021

Related U.S. Application Data

(60) Provisional application No. 62/936,782, filed on Nov. 18, 2019.

(51) Int. Cl.
*F04B 49/22* (2006.01)
*E21B 15/00* (2006.01)
(Continued)

(52) U.S. Cl.
CPC ............ *F04B 49/225* (2013.01); *E21B 15/00* (2013.01); *F04B 17/03* (2013.01); *F04B 49/06* (2013.01);
(Continued)

(58) Field of Classification Search
CPC ...... F15B 13/0807; F15B 21/08; F04B 17/03; F04B 49/06; F04B 49/22; F04B 23/04;
(Continued)

(56) References Cited

U.S. PATENT DOCUMENTS 2,976,025 A   3/1961 Pro
3,878,884 A   4/1975 Raleigh
(Continued)

FOREIGN PATENT DOCUMENTS

CA   3067854 A1   1/2019
CN   104117308 A   10/2014
(Continued)

OTHER PUBLICATIONS

Non-Final Office Action issued in U.S. Appl. No. 16/871,928 dated Aug. 25, 2021.
(Continued)

*Primary Examiner* — Atif H Chaudry
(74) *Attorney, Agent, or Firm* — Hogan Lovells US LLP (57) ABSTRACT

A hydraulic fracturing valve control system includes an electric powered, multi-plunger hydraulic fracturing pump. The system also includes a manifold coupled to the hydraulic fracturing pump. The system further includes a valve associated with the manifold, the valve being operable to move between an open position, a closed position, and a plurality of intermediate positions. The system includes a valve actuator, coupled to the valve, the valve actuator being an electric actuator that is remotely controllable in response to one or more operational aspects of the hydraulic fracturing pump. The system also includes a control interface, the control interface forming at least a portion of a control system, the control interface being accessible from a loca-
(Continued)

tion remote from the hydraulic fracturing pump and outside of a zone of pressure formed by the hydraulic fracturing pump during operation.

19 Claims, 7 Drawing Sheets

(51) Int. Cl.
| | |
|---|---|
| *F04B 17/03* | (2006.01) |
| *F04B 49/06* | (2006.01) |
| *F15B 13/08* | (2006.01) |
| *F15B 21/08* | (2006.01) |
| *F16K 27/00* | (2006.01) |
| *F16K 31/02* | (2006.01) |

(52) U.S. Cl.
CPC .......... *F04B 49/22* (2013.01); *F15B 13/0807* (2013.01); *F15B 21/08* (2013.01); *F16K 27/003* (2013.01); *F16K 31/02* (2013.01)

(58) Field of Classification Search
CPC ...... F04B 49/065; F04B 23/06; F04B 49/225; E21B 43/2607
See application file for complete search history.

(56) References Cited

U.S. PATENT DOCUMENTS

| | | | |
|---|---|---|---|
| 4,411,313 A | 10/1983 | Johnson et al. | |
| 4,538,916 A | 9/1985 | Zimmerman | |
| 4,601,629 A | 7/1986 | Zimmerman | |
| 4,768,884 A | 9/1988 | Elkin | |
| 4,876,653 A * | 10/1989 | McSpadden | G05D 11/132 |
| | | | 700/265 |
| 5,114,239 A | 5/1992 | Allen | |
| 5,334,899 A | 8/1994 | Skybyk | |
| 5,439,066 A | 8/1995 | Gipson | |
| 5,486,047 A | 1/1996 | Zimmerman | |
| 5,517,822 A | 5/1996 | Haws et al. | |
| 5,798,596 A | 8/1998 | Lordo | |
| 5,813,455 A | 9/1998 | Pratt et al. | |
| 5,950,726 A | 9/1999 | Roberts | |
| 6,035,265 A | 3/2000 | Dister et al. | |
| 6,097,310 A | 8/2000 | Harrell et al. | |
| 6,121,705 A | 9/2000 | Hoong | |
| 6,273,193 B1 | 8/2001 | Hermann et al. | |
| 6,442,942 B1 | 9/2002 | Kopko | |
| 6,585,455 B1 | 7/2003 | Petersen et al. | |
| 6,626,646 B2 | 9/2003 | Rajewski | |
| 6,765,304 B2 | 7/2004 | Baten et al. | |
| 6,788,022 B2 | 9/2004 | Sopko | |
| 6,985,750 B1 | 1/2006 | Vicknair et al. | |
| 7,795,830 B2 | 9/2010 | Johnson | |
| 8,506,267 B2 | 8/2013 | Gambier et al. | |
| 8,763,387 B2 | 7/2014 | Schmidt | |
| 8,795,525 B2 | 8/2014 | McGinnis et al. | |
| 9,051,923 B2 | 6/2015 | Kuo | |
| 9,062,545 B2 | 6/2015 | Roberts et al. | |
| 9,140,105 B2 | 9/2015 | Pattillo | |
| 9,353,593 B1 | 5/2016 | Lu et al. | |
| 9,482,086 B2 | 11/2016 | Richardson et al. | |
| 9,506,333 B2 | 11/2016 | Castillo et al. | |
| 9,706,185 B2 | 7/2017 | Ellis | |
| 9,739,546 B2 | 8/2017 | Bertilsson et al. | |
| 9,790,858 B2 | 10/2017 | Kanebako | |
| 9,945,365 B2 | 4/2018 | Hernandez et al. | |
| 10,184,465 B2 | 1/2019 | Enis et al. | |
| 10,221,639 B2 | 3/2019 | Romer et al. | |
| 10,408,030 B2 | 9/2019 | Oehring et al. | |
| 10,408,031 B2 | 9/2019 | Oehring et al. | |
| 10,415,332 B2 | 9/2019 | Morris et al. | |
| 10,627,003 B2 | 4/2020 | Dale et al. | |
| 10,648,270 B2 | 5/2020 | Brunty et al. | |
| 10,648,311 B2 | 5/2020 | Oehring et al. | |
| 10,669,471 B2 | 6/2020 | Schmidt et al. | |
| 10,686,301 B2 | 6/2020 | Oehring et al. | |
| 10,695,950 B2 | 6/2020 | Igo et al. | |
| 10,711,576 B2 | 7/2020 | Bishop | |
| 10,731,561 B2 | 8/2020 | Oehring et al. | |
| 10,740,730 B2 | 8/2020 | Altamirano et al. | |
| 10,767,561 B2 | 9/2020 | Brady | |
| 10,781,752 B2 | 9/2020 | Kikkawa et al. | |
| 10,794,165 B2 | 10/2020 | Fischer et al. | |
| 10,988,998 B2 | 4/2021 | Fischer et al. | |
| 2001/0000996 A1 | 5/2001 | Grimland et al. | |
| 2004/0045703 A1 | 3/2004 | Hooper et al. | |
| 2005/0201197 A1 | 9/2005 | Duell et al. | |
| 2006/0109141 A1 | 5/2006 | Huang | |
| 2008/0095644 A1 | 4/2008 | Mantei et al. | |
| 2008/0164023 A1 | 7/2008 | Dykstra et al. | |
| 2008/0257449 A1 | 10/2008 | Weinstein et al. | |
| 2008/0277120 A1 | 11/2008 | Hickie | |
| 2009/0072645 A1 | 3/2009 | Quere | |
| 2011/0081268 A1 | 4/2011 | Ochoa et al. | |
| 2011/0110793 A1 | 5/2011 | Leugemors et al. | |
| 2012/0063936 A1 | 3/2012 | Baxter et al. | |
| 2012/0112757 A1 | 5/2012 | Vrankovic et al. | |
| 2012/0150455 A1 | 6/2012 | Franklin et al. | |
| 2012/0152716 A1 | 6/2012 | Kikukawa et al. | |
| 2012/0203507 A1* | 8/2012 | Thomeer | E21B 41/00 |
| | | | 702/183 |
| 2013/0051971 A1 | 2/2013 | Wyse et al. | |
| 2013/0189629 A1 | 7/2013 | Chandler | |
| 2013/0255271 A1 | 10/2013 | Yu et al. | |
| 2013/0284455 A1 | 10/2013 | Kajaria et al. | |
| 2014/0174717 A1 | 6/2014 | Broussard et al. | |
| 2015/0147194 A1 | 5/2015 | Foote | |
| 2015/0233530 A1 | 8/2015 | Sandidge | |
| 2015/0275891 A1* | 10/2015 | Chong | F04B 53/147 |
| | | | 417/419 |
| 2016/0006311 A1 | 1/2016 | Li | |
| 2016/0032703 A1* | 2/2016 | Broussard | E21B 43/2607 |
| | | | 166/250.01 |
| 2016/0230660 A1 | 8/2016 | Zeitoun et al. | |
| 2016/0273456 A1 | 9/2016 | Zhang et al. | |
| 2016/0326853 A1 | 11/2016 | Fred et al. | |
| 2017/0043280 A1 | 2/2017 | Vankouwenberg | |
| 2017/0074076 A1 | 3/2017 | Joseph et al. | |
| 2017/0082033 A1 | 3/2017 | Wu et al. | |
| 2017/0096889 A1 | 4/2017 | Blanckaert et al. | |
| 2017/0138171 A1 | 5/2017 | Richards et al. | |
| 2017/0204852 A1 | 7/2017 | Barnett | |
| 2017/0212535 A1 | 7/2017 | Shelman et al. | |
| 2017/0370639 A1 | 12/2017 | Barden et al. | |
| 2018/0090914 A1 | 3/2018 | Johnson et al. | |
| 2018/0181830 A1 | 6/2018 | Aharuka et al. | |
| 2018/0259080 A1 | 9/2018 | Dale et al. | |
| 2018/0266217 A1 | 9/2018 | Funkhauser et al. | |
| 2018/0284817 A1 | 10/2018 | Cook et al. | |
| 2018/0298731 A1 | 10/2018 | Bishop | |
| 2018/0312738 A1 | 11/2018 | Rutsch et al. | |
| 2018/0313677 A1 | 11/2018 | Warren et al. | |
| 2018/0363640 A1 | 12/2018 | Kajita et al. | |
| 2018/0366950 A1 | 12/2018 | Pedersen et al. | |
| 2019/0040727 A1 | 2/2019 | Oehring et al. | |
| 2019/0128104 A1 | 5/2019 | Graham et al. | |
| 2019/0145251 A1 | 5/2019 | Johnson | |
| 2019/0154020 A1 | 5/2019 | Glass | |
| 2019/0249527 A1 | 8/2019 | Kraynek | |
| 2019/0257462 A1 | 8/2019 | Rogers | |
| 2020/0040878 A1 | 2/2020 | Morris | |
| 2020/0047141 A1 | 2/2020 | Oehring et al. | |
| 2020/0088152 A1 | 3/2020 | Allion et al. | |
| 2020/0325760 A1 | 10/2020 | Markham | |
| 2020/0350790 A1 | 11/2020 | Luft et al. | |

FOREIGN PATENT DOCUMENTS

| | | |
|---|---|---|
| CN | 104196613 A | 12/2014 |
| CN | 205986303 U | 2/2017 |
| CN | 108049999 A | 5/2018 |
| CN | 112196508 A | 1/2021 |
| WO | 2009046280 | 4/2009 |

(56) References Cited

FOREIGN PATENT DOCUMENTS

| WO | 2014177346 | | 11/2014 |
| WO | 2018044307 | A1 | 3/2018 |
| WO | 2018213925 | A1 | 11/2018 |
| WO | 2019210417 | | 11/2019 |

OTHER PUBLICATIONS

Non-Final Office Action issued in U.S. Appl. No. 16/943,727 dated Aug. 3, 2021.
Non-Final Office Action issued in U.S. Appl. No. 14/881,525 dated Jul. 21, 2021.
Non-Final Office Action issued in U.S. Appl. No. 16/404,283 dated Jul. 21, 2021.
Notice of Allowance and Notice of Allowability issued in U.S. Appl. No. 15/829,419 dated Jul. 26, 2021.
Woodbury et al., "Electrical Design Considerations for Drilling Rigs," IEEE Transactions on Industry Applications, vol. 1A-12, No. 4, Jul./Aug. 1976, pp. 421-431.
Morris et al., U.S. Appl. No. 62/526,869; Hydration-Blender Transport and Electric Power Distribution for Fracturing Operation; Jun. 28, 2018; USPTO; see entire document.
Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.
Non-Final Office Action dated Jan. 29, 2021 in US 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.
International Search Report and Written Opinion dated Dec. 14, 2020 in PCT/US2020/53980.
Non-Final Office dated Oct. 26, 2020 in U.S. Appl. No. 15/356,436.
Non-Final Office dated Oct. 5, 2020 in U.S. Appl. No. 16/443,273.
Non-Final Office Action dated Sep. 29, 2020 in U.S. Appl. No. 16/943,727.
Non-Final Office Action dated Sep. 2, 2020 in U.S. Appl. No. 16/356,263.
Non-Final Office Action dated Aug. 31, 2020 in U.S. Appl. No. 16/167,083.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action dated Sep. 22, 2020 in Canadian Application No. 2,982,974.
International Search Report and Written Opinion dated Sep. 3, 2020 in PCT/US2020/36932.
"Process Burner" (https://www.cebasrt.com/productsloii-gaslprocessbumer) Sep. 6, 2018 (Sep. 6, 2018), entire document, especially para (Burners for refinery Heaters].
Water and Glycol Heating Systems. (https://www.heat-inc.com/wg-series-water-glycol-systems/) Jun. 18, 2018 (Jun. 18, 2018), entire document, especially WG Series Water Glycol Systems.
"Heat Exchanger" (https://en.wikipedia.org/w/index.php?title=Heat_exchanger&oldid=89300146) Dec. 18, 2019 Apr. 2019 (Apr. 18, 2019), entire document, especially para (0001].
Canadian Office Action dated Sep. 8, 2020 in Canadian Patent Application No. 2,928,707.
Canadian Office Action dated Aug. 31, 2020 in Canadian Patent Application No. 2,944,980.
International Search Report and Written Opinion dated Aug. 28, 2020 in PCT/US20/23821.
International Search Report and Written Opinion mailed in PCT/US20/67526 dated May 6, 2021.
International Search Report and Written Opinion mailed in PCT/US20/67608 dated Mar. 30, 2021.
International Search Report and Written Opinion mailed in PCT/US20/67528 dated Mar. 19, 2021.
International Search Report and Written Opinion mailed in PCT/US20/67146 dated Mar. 29, 2021.
International Search Report and Written Opinion mailed in PCT/US20/67523 dated Mar. 22, 2021.
International Search Report and Written Opinion mailed in PCT/US2020/066543 dated May 11, 2021.
Kroposki et al., Making Microgrids Work, 6 IEEE Power and Energy Mag. 40, 41 (2008).
Dan T. Ton & Merrill A. Smith, The U.S. Department of Energy's Microgrid Initiative, 25 The Electricity J. 84 (2012), pp. 84-94.
Non-Final Office Action issued in U.S. Appl. No. 16/871,328 dated Dec. 9, 2021.
Non-Final Office Action issued in U.S. Appl. No. 16/943,935 dated Oct. 21, 2021.
Non-Final Office Action issued in U.S. Appl. No. 16/564,186 dated Oct. 15, 2021.
Final Office Action issued in U.S. Appl. No. 16/356,263 dated Oct. 7, 2021.
Non-Final Office Action issued in U.S. Appl. No. 17/060,647 dated Sep. 20, 2021.
Non-Final Office Action issued in U.S. Appl. No. 16/901,774 dated Sep. 14, 2021.
Canadian Office Action issued in Canadian Application No. 3,094,768 dated Oct. 28, 2021.

* cited by examiner

FIG. 5 ered. However, pressure
ELECTRICALLY ACTUATED VALVES FOR MANIFOLD TRAILERS OR SKIDS

CROSS REFERENCE TO RELATED APPLICATIONS

This application claims priority to and the benefit of U.S. Provisional Application Ser. No. 62/936,782 filed Nov. 18, 2019 titled "Electrically Actuated Valves for Manifold Trailers or Skids," the full disclosure of which is hereby incorporated herein by reference in its entirety for all purposes.

BACKGROUND

1. Technical Field

This disclosure relates generally to hydraulic fracturing and more particularly to systems and methods for remote control of valves used with hydraulic fracturing systems. More specifically, the valves may be electrically controlled valves that form at least a portion of a manifold coupled to one or more fracturing pumps.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant into the fluid, cranes, wireline units, and many other components that all must perform different functions to carry out fracturing operations.

Usually in fracturing systems the fracturing equipment runs on diesel-generated mechanical power or by other internal combustion engines. Such engines may be very powerful, but have certain disadvantages. Diesel is more expensive, is less environmentally friendly, less safe, and heavier to transport than natural gas. For example, heavy diesel engines may require the use of a large amount of heavy equipment, including trailers and trucks, to transport the engines to and from a wellsite. In addition, such engines are not clean, generating large amounts of exhaust and pollutants that may cause environmental hazards, and are extremely loud, among other problems. Onsite refueling, especially during operations, presents increased risks of fuel leaks, fires, and other accidents. The large amounts of diesel fuel needed to power traditional fracturing operations requires constant transportation and delivery by diesel tankers onto the well site, resulting in significant carbon dioxide emissions.

Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems. Turbine use is well known as a power source, but is not typically employed for powering fracturing operations.

Though less expensive to operate, safer, and more environmentally friendly, turbine generators come with their own limitations and difficulties as well. As is well known, turbines generally operate more efficiently at higher loads. Many power plants or industrial plants steadily operate turbines at 98% to 99% of their maximum potential to achieve the greatest efficiency and maintain this level of use without significant difficulty. This is due in part to these plants having a steady power demand that either does not fluctuate (i.e., constant power demand), or having sufficient warning if a load will change (e.g., when shutting down or starting up a factory process).

Space is at a premium at a fracturing site, where different vendors are often working simultaneously to prepare for a fracturing operation. As a result, utilizing systems that have large footprints may be undesirable. However, pressure pumpers still need to be able to provide sufficient pumping capacity in order to complete fracturing jobs.

During a fracturing operation, one or more areas may be subjected to high pressure and, as a result, may limit or prevent access into various regions (e.g., pressure zones) by operators. These pressure zones may include components that are utilized in operations, such as valves, sensors, gauges, and the like. Accordingly, leaks or failures may shut down fracturing operations or cause operational upsets.

SUMMARY

The present disclosure is directed to a method and system for a modular switchgear system and power distribution for electric oilfield equipment.

In an embodiment, a hydraulic fracturing valve control system includes an electric powered, multi-plunger hydraulic fracturing pump. The system also includes a manifold coupled to the hydraulic fracturing pump. The system further includes a valve associated with the manifold, the valve being operable to move between an open position, a closed position, and a plurality of intermediate positions. The system includes a valve actuator, coupled to the valve, the valve actuator being an electric actuator that is remotely controllable in response to one or more operational aspects of the hydraulic fracturing pump. The system also includes a control interface, the control interface forming at least a portion of a control system, the control interface being accessible from a location remote from the hydraulic fracturing pump and outside of a zone of pressure formed by the hydraulic fracturing pump during operation.

In an embodiment, a hydraulic fracturing valve control system includes a plurality of electric powered, multi-plunger hydraulic fracturing pumps. The system also includes a manifold coupled to the plurality of hydraulic fracturing pumps. The system further includes a plurality of valves associated with the manifold, each valve of the plurality of valves being operable to move between an open position, a closed position, and a plurality of intermediate positions. The system also includes a plurality of valve actuators, coupled to respective valves of the plurality of valves, each of the valve actuators being electric actuators configured to be remotely controllable in response to one or more operational aspects of at least one hydraulic fracturing pump of the plurality of hydraulic fracturing pumps. The system includes a control interface, the control interface forming at least a portion of a control system, the control interface being accessible from a location remote from the plurality of hydraulic fracturing pumps and outside of a zone of pressure formed by the plurality of hydraulic fracturing pumps during operation.

BRIEF DESCRIPTION OF DRAWINGS

Some of the features and benefits of the present disclosure having been stated, others will become apparent as the description proceeds when taken in conjunction with the accompanying drawings, in which.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

In hydraulic fracturing, slurry travels from a blender through a manifold trailer or skid, which helps distribute fluid to, individual hydraulic fracturing pumps ("frac pumps" or "pumps"). The manifold trailer has multiple sets of valves so that fluid can be directed properly to the pumps. The manifold trailer or skid usually includes high pressure lines or is placed in an area where there are also high pressure lines in close proximity. Due to the danger posed by proximity to the high pressure lines, access to the area is often restricted, and actuating the valves on the low pressure manifold is not always possible. One solution to this problem is the use of electric, air, hydraulic, or any other alternative means to actuate the valves.

One aspect of the embodiments of the technology is to provide quick remedies to isolate a single pump during operation if necessary. This can happen for various reasons. For example, in some instances a pump may have a leak in the middle of a hydraulic fracturing treatment, and operations cannot simply shut down to remedy the problem. With the present technology, an operator may turn the pump off from a safe distance, using remote pump controls. In other instances, shutting a valve may be necessary to prevent suspended sand in the fluid being pumped from settling out in the hose connected from the manifold/skid to the pump. Moreover, other examples include the potential to sand off, or fill the suction manifold of the pump with sand, which can lead to additional wear and tear on hose and components. Any of these problems can lead to added downtime to clean up and prepare the pump for use after it has been repaired if not addressed efficiently.

Another scenario which may require prompt action to remotely shut valves is the event of a packing or suction hose failure. When the packing fails in a pump, and fluid is still being supplied to it, a substantial leak is created, thereby giving rise to the need to close the valve to shut off fluid supply. In addition, a burst suction hose could force operations to shut down due to the volume of slurry being spilled. Shutting down in the middle of a frac stage could result in the complication of the well stimulation process, and may cause expensive or time consuming processes to clean out the well. Such processes can include flow back, coiled tubing operations, workover rigs, wireline tractor operations, or even stage abandonment.

In addition, one advantageous reason why this action cannot be performed manually during active operations is due to safety. As discussed above, the location of the valve is in a high pressure area posing obvious hazards which is, in most cases, deemed off limits during operations, thereby making manual control of the valves impractical. The solution, introduced with the present technology, is to actuate these valves remotely from a safe distance powered by electricity.

One embodiment of controlling the valves is to integrate new valve control logic into each of the pumps. This allows each pump to have control of its respective valve. In other words, individual control logic may be established for valves coupled to a pump driven by the operational aspects of the pump. Operators can control the system from the multi-pump interface in a data van and from the human machine interface (HMI) that resides on each pump. The operators can view the state of each valve (e.g., open/closed or percent open/closed) and set the desired state of the valve. In various embodiments, the pump control systems can supply the power that is required by the actuators, thereby reducing congestion at the well site and providing a modular, segmented control unit. Further simplification of site cabling can be achieved by mounting the interconnect box on the manifold.

In some scenarios, the pump control system may not be able to supply the required power. In such scenarios, an external power source and relays can be used to convert the low power control signal from the pump to one that is compatible with the actuator. The conversion can be in a central location on the manifold, or distributed throughout the manifold at each valve location. Electrical power sources may include any acceptable mode of power generation, including a stand-alone generator. Alternatively, the valves can be pneumatically or hydraulically controlled, in which case an air compressor or hydraulic system could provide the energy required.

According to another embodiment, the valves can be controlled using a dedicated valve controller on the manifold that communicates directly with the multi-pump control interface or from a standalone application, among various options. This has the advantage of reducing the number of cables between the pumps and manifold, but my increase the complexity of the control system. It also introduces more opportunity for the pumps to be out-of-sync with their valves. For example, there may be delays between control signals when a single controller is utilized to operate a group of valves. Other control system configurations are also possible and may provide additional advantages.

One benefit of the present technology is to enable remote control of valves, so that such control can be enabled safely from a distance. Incorporating the system of the present technology into existing control systems allows for automation and logic to be created so that the valve control process is more intelligent, in order to prevent accidental valve orientation. Selecting a valve that meets torque, pressure, and actuation time specifications is beneficial for the system to function and work properly. Additional fail safes can optionally be included, such as battery back-ups and valve position designations if power is lost. Furthermore some embodiments can include the capability to factor in the state of other equipment, such as the blender or power generation equipment, when controlling the valve position. Additional sensors may be used to indicate flow rates, pressure, etc.

The present technology provides advantages over hydraulic valve systems. For example, hydraulic systems are vulnerable to leaks in hydraulic lines and connections. When a hydraulic system starts to leak it begins to lose pressure, thus losing functionality. None of these problems are present in an electric valve control system.

Another advantage of the present technology is that it reduces or eliminates the need for a person to manually close the valve, which requires entering a high pressure area, at any time it is needed. It can also reduce the possibility of equipment damage by ensuring the valve position is always in a state that is compatible with the current state of the pump.

In the past when a pump was isolated, a person would manually close the valve, or in the case when this action is prohibited, the valve would stay open until operations were complete. This results in added downtime to remove the hose and then clean the sand out of it, which has settled and collected inside. This in itself can pose additional safety hazards.

With any remotely controlled device, disadvantages come by way of reliance, durability and troubleshooting. These potential limitations can be overcome by allowing the valves to be actuated manually in extreme or emergency situations. Other limitations may come in right sizing the electric actuator to ensure proper torque needed to actuate the valve in its potential conditions. Also the speed in which the valve opens/closes needs to be considered. This issue, however, can be overcome by using available actuators that have adjustable speeds.

Alternate embodiments of the present technology include a variety of power sources including electricity, hydraulic power or air actuation. In addition, different valve styles can be used for isolation, including, but not limited to, butterfly valves, ball valves, dart valves, flapper style valves, continuously variable valve, or any other valve system. In addition, communication between the actuators, controllers, and interfaces may be analog or digital. Actuation voltages can be 12 VDC, 24 VDC, 48 VDC, 120 VAC, 240 VAC, 600 VAC, 690 VAC. Power for controls and actuation can be from the associated frac pump trailer or onboard the manifold (missile) trailer. Power on the manifold trailer can come from solar panels with a storage battery bank, a small onboard generator, an external source such as a light plant, from the data van generator with or without an onboard battery bank, or from turbine power on an electric fleet. If power is provided from a frac pump trailer, it be from the onboard control power batteries, or stepped down from the incoming turbine power for electric frac pumps. Small heaters can also be included in the valve actuators to prevent failures caused by condensation.

Additional embodiments of the present technology can include a main control screen where an operator can continuously see the existing state of all the valves, with the ability to change those states by putting in a command through the system remotely. Additional automation could be incorporated by linking this system to existing pump controls and using logic to indicate if a pump is on and pumping, or fluid is flowing. The technology could determine that if a pump is not running to shut the valve automatically to prevent the risk of leaks, failures, or other issues by leaving a valve open for a pump that is not running. This logic can also ensure to never shut a valve while fluid is flowing, which will help to ensure prevention of other failure modes if such tasks were completed. Other embodiments can include the ability to adjust or change the valve type, allowing for the use of wafer, gate, dart, flapper, or any other valve type.

Further embodiments may additionally include features such as torque limiting ranges on electric actuators to prevent stem failure. Additionally, the valves and/or actuators may provide position indicator feedback into the data van for orientation of valves (e.g., to aid in verification of valve open or close position). Furthermore, various embodiments may enable manual override, for example, by using mechanical devices to open or close valves. Furthermore, valves and/or actuators may include built in controls to operate valves in the event of software malfunctions. For example, an electric actuator may include a switch or the like that an operator could press to override and control the valves. In various embodiments, battery back up in the event of power loss. Various systems may include logic or automation and may include information received from additional sensors to make logic/automation more reliable and also to expand the equipment utilized to make control decisions.

Figure 1:
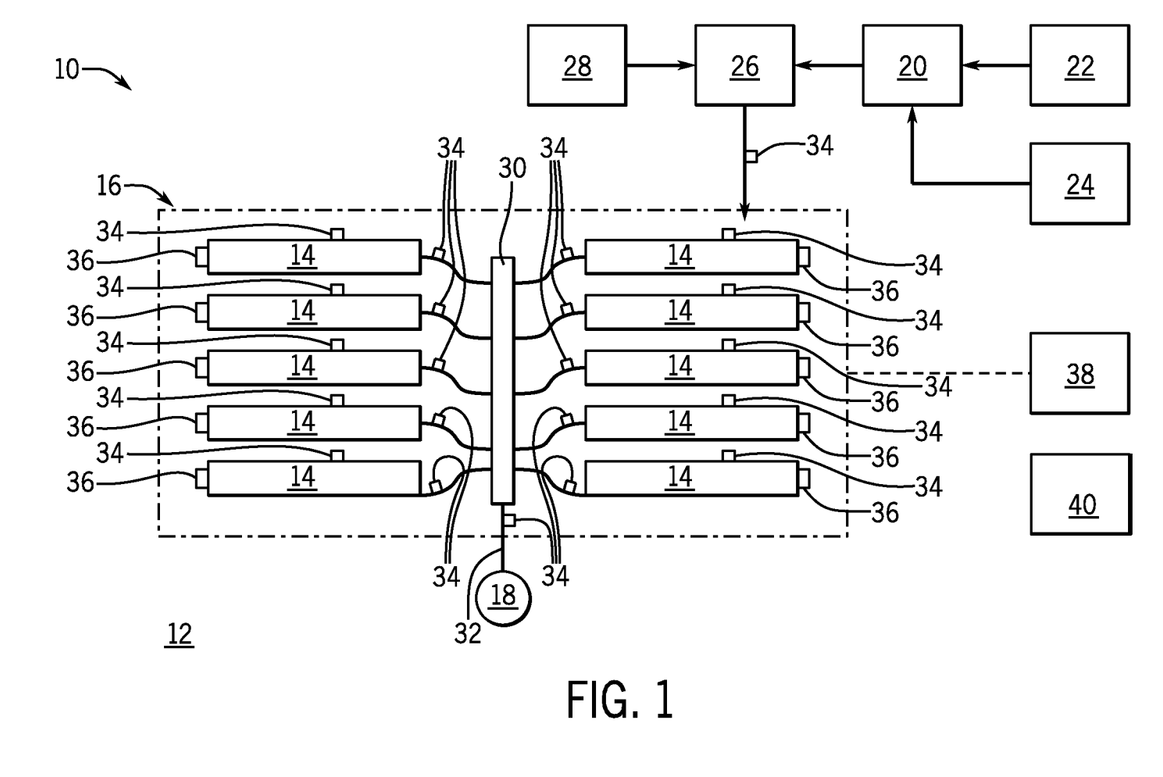
FIG. 1 is a schematic plan view of an embodiment of a fracturing operation, in accordance with embodiments of the present disclosure.

FIG. 1 is a plan schematic view of an embodiment of a hydraulic fracturing system 10 positioned at a well site 12. In the illustrated embodiment, pumping units 14 (e.g., pump trucks), which make up a pumping system 16, are used to pressurize a slurry solution for injection into a wellhead 18. An optional hydration unit 20 receives fluid from a fluid source 22 via a line, such as a tubular, and also receives additives from an additive source 24. In an embodiment, the fluid is water and the additives are mixed together and transferred to a blender unit 26 where proppant from a proppant source 28 may be added to form the slurry solution (e.g., fracturing slurry) which is transferred to the pumping system 16. The pumping units 14 may receive the slurry solution at a first pressure (e.g., 80 psi to 160 psi) and boost the pressure to around 15,000 psi for injection into the wellhead 18. In certain embodiments, the pumping units 14 are powered by electric motors.

After being discharged from the pump system 16, a distribution system 30, such as a missile, receives the slurry solution for injection into the wellhead 18. The distribution system 30 consolidates the slurry solution from each of the pump trucks 14 and includes discharge piping 32 coupled to the wellhead 18. In this manner, pressurized solution for hydraulic fracturing may be injected into the wellhead 18.

In the illustrated embodiment, one or more sensors 34, 36 are arranged throughout the hydraulic fracturing system 10 to measure various properties related to fluid flow, vibration, and the like. In embodiments, the sensors 34, 36 transmit flow data to a data van 38 for collection and analysis, among other things. Furthermore, while not pictured in FIG. 1, there may be various valves distributed across the system. For examples, a manifold (not pictured) may be utilized to supply fluid to the pumping units 14 and/or to receive the pressurized fluid from the pumping units 14. Valves may be distributed to enable isolation of one or more components. As an example, there may be valves arranged to enable isolation of individual pumping units 14, Furthermore, various support units may also include valves to enable isolation. As noted above, it may be desirable to isolate singular pumping units 14 or the like if operation upsets are detected. This would enable operations to continue, although at a lower rate, and may potential environmental or personnel hazards, as well as prevent increased damage to the components. However, during operations, personnel may be evacuated or otherwise restricted from entering a pressure zone. Embodiments of the present disclosure may enable remote operation of the valves and, in various embodiments, may enable electrical control using electric energy provided on site, such as through a generator or the like.

A power generation system 40 is shown, which may include turbines, generators, switchgears, transformers, and the like. In various embodiments, the power generation system 40 provides energy for one or more operations at the well site. It should be appreciated that while various embodiments of the present disclosure may describe electric motors powering the pumping units 14, in embodiments, electrical generation can be supplied by various different options, as well as hybrid options. Hybrid options may include two or more of the following electric generation options: Gas turbine generators with fuel supplied by field gas, CNG, and/or LNG, diesel turbine generators, diesel engine generators, natural gas engine generators, batteries, electrical grids, and the like. Moreover, these electric sources may include a single source type unit or multiple units. For example, there may be one gas turbine generator, two gas turbines generators, two gas turbine generators coupled with one diesel engine generator, and various other configurations.

In various embodiments, equipment at the well site may utilize 3 phase, 60 Hz, 690V electrical power. However, it should be appreciated that in other embodiments different power specifications may be utilized, such as 4160V or at different frequencies, such as 50 Hz. Accordingly, discussions herein with a particular type of power specification should not be interpreted as limited only to the particularly discussed specification unless otherwise explicitly stated. Furthermore, systems described herein are designed for use in outdoor, oilfield conditions with fluctuations in temperature and weather, such as intense sunlight, wind, rain, snow, dust, and the like. In embodiments, the components are designed in accordance with various industry standards, such as NEMA, ANSI, and NFPA.

Figure 2A:
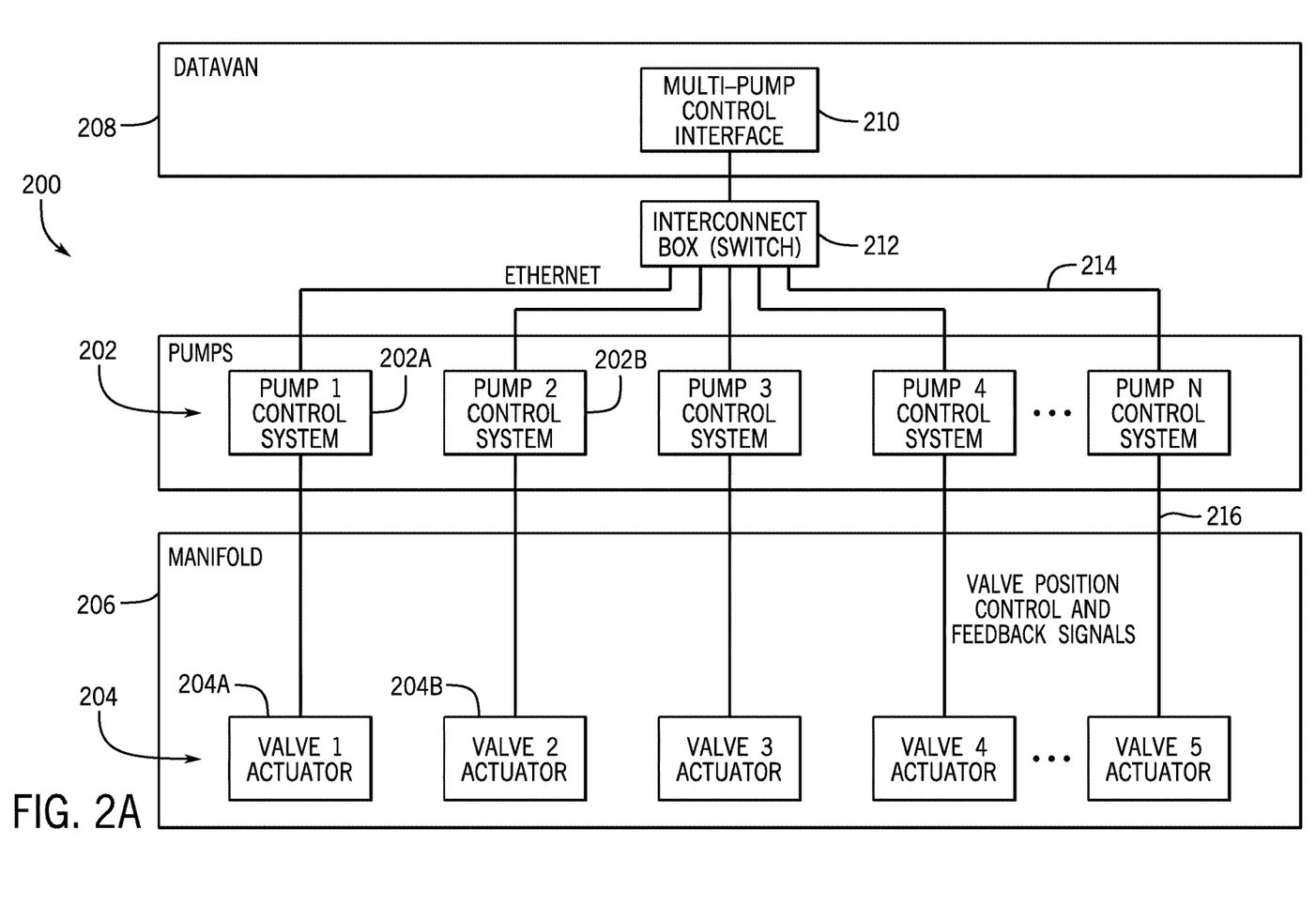
FIG. 2A is a schematic diagram of an embodiment of a pumping configuration using a valve control system, in accordance with embodiments of the present disclosure.

FIG. 2 is a block diagram of an embodiment of a pumping configuration 200 in which pumps 202 (which may be part of the pumping units 14 and/or the pumping system 16) are utilized to control valve actuators 204, coupled to valves (not pictured) associated with a manifold 206. In this configuration, each pump 200 has singular control over a specific valve actuator 204 and provides electric energy to drive the valve actuator 204, and therefore the valve, between an open position, a closed position, and/or an intermediate position (e.g., a percentage of the valve being open between 0 percent (%) and 100 percent (%)).

In this example, a data van 208 includes a multi-pump control interface 210. This interface may be utilized to send and/or receive signals to/from the pumps 202. For example, the control interface 210 may distribute a control signal to turn on and/or turn off one or more of the pumps 202. It should be appreciated that the signals may be tagged for specific pumps 202 and, in various embodiments, may be distributed simultaneously or substantially simultaneously. For example, a first signal may include a metadata tag such that the signal is directed toward the pump 202A while a second signal may include a metadata tag such that the signal is directed toward the pump 202B. By way of example, the first signal may be a signal to turn off the pump 202A while the second signal may be a signal to speed up the pump 202B. It should be appreciated that the interface 210 may be part of a larger computing system that includes a memory and processor, where the processor executes instructions stored on the memory. The control interface 210 may include a touch screen interface or any other type of input (e.g., keyboard, mouse, etc.) to enable an operator to enter information. Operators can control the system from the multi-pump interface 210 in the data van, in various embodiments, and also from a human machine interface (HMI) that resides on each pump 202. Accordingly, operations personnel can view the state of each valve (e.g., open/closed or percent open/closed) and set the desired state of the valve from either location, and as a result, can perform operations at the pump when the area is prepared for entry and then from the data van 208 during operations where access may be restricted. Moreover, the control interface 210 may include a display and be substantially autonomous such that the display provides information to operators, but uses limited or no input from the operators.

Further illustrated in FIG. 2A is an interconnect box 212 (e.g., switch) arranged between the data van 208 and the pumps 202. It should be appreciated that the interconnect box 212 may be integrated into the data van 208 or may be a separate component that provides a connection 214 between the data van 208 and the pumps 202. In this example, the connection 214 is a data connection, such as an Ethernet cable, but it should be appreciated that other connections may be utilized and also that wireless communication systems may be deployed with embodiments of the present disclosure.

As noted above, individual pumps 202 may provide individual control signals to the valve actuators 204 and/or receive information from the valve actuators 204, such as valve position signals, feedback signals, and the like. In this example, the pump 202A is communicatively coupled to the valve actuator 204A, via a connection 216, such that a data signal, which may come from the control interface 210, may be transmitted to the valve actuator 204A via the pump 202. It should be appreciated that the connections 216 may be different from the connections 214. For example, the connections 214 may be Ethernet connections, among other options, while the connections 214 may be control signal connections or power connections. In various embodiments, it should be appreciated that the signal may be in the form of an electrical communication that may provide power sufficient to drive operational control of the valve actuator 204A. For example, the signal may be in the form of a voltage that exceeds a threshold and activates the valve actuator 204A to drive rotation of a valve stem in order to move a valve (not pictured) between a first position (e.g., closed) and a second position (e.g., open). As noted above, in various embodiments, the power for operating the valve actuators 204 may be provided by the respective pumps 202, thereby reducing the equipment at the well and enabling remote operations without inclusion of other equipment, such as hydraulic or pneumatic tanks.

Figure 2B:
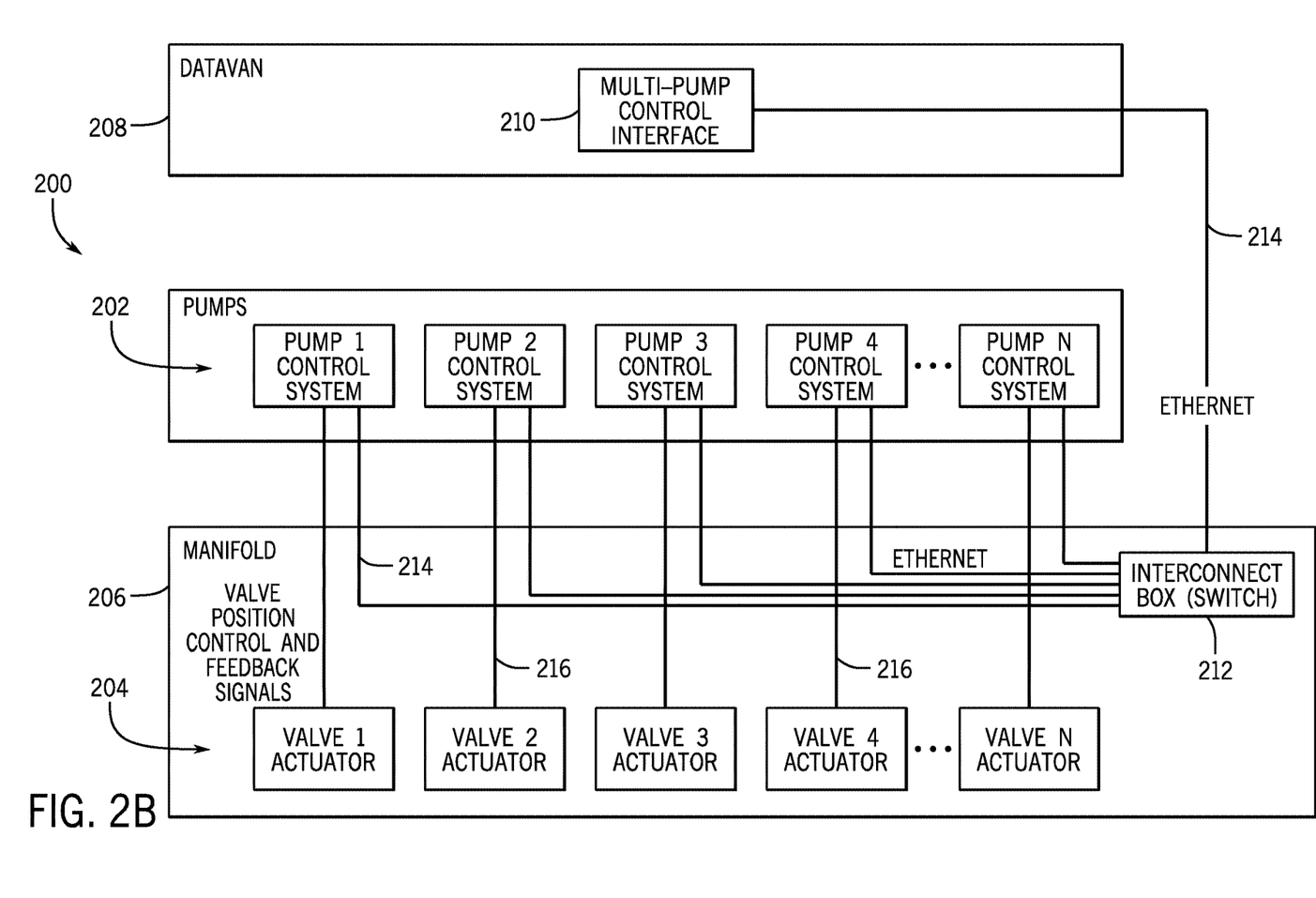
FIG. 2B is a schematic diagram of an embodiment of a pumping configuration using a valve control system, in accordance with embodiments of the present disclosure.

FIG. 2B is a schematic diagram of an embodiment of a pumping configuration 250 that shares several features with FIG. 2A, including the pumps 202, actuators 204, manifold 206, and data van 208, among other components. The illustrated embodiment provides further simplification for the configuration 250 by mounting the interconnect box 212 at the manifold 206. In various embodiments, this may provide for a reduced cabling distance, as the manifold 206 is often closer to the pumps 202 than the data van 208, thereby reducing the distance of cabling between the interconnect box 212, which may provide reduced latency with the signals. Furthermore, less overall cabling may be utilized, which may save money for the operator. Additionally, the manifold 206 with the integrated interconnect box 212 may also provide for easier and simplified mobilization and demobilization due to the close proximity to the pumps 202 and/or labeling which directs operators how to configure the system.

In this example, the connections 214 extend between the pumps 202 and the interconnect box 212 and also between the interconnect box 212 and the data van 208 (e.g., to the control interface 210). However, the connections 216 still extend between the pumps 202 and the actuators 204. As noted above, these may be different connection types, or in various embodiments, may be the same connection types. Accordingly, in various embodiments, a control signal may be transmitted from the data van 208 to the pumps 202 and then may be relayed in the form of operational control of one or more valves 204.

Figure 3:
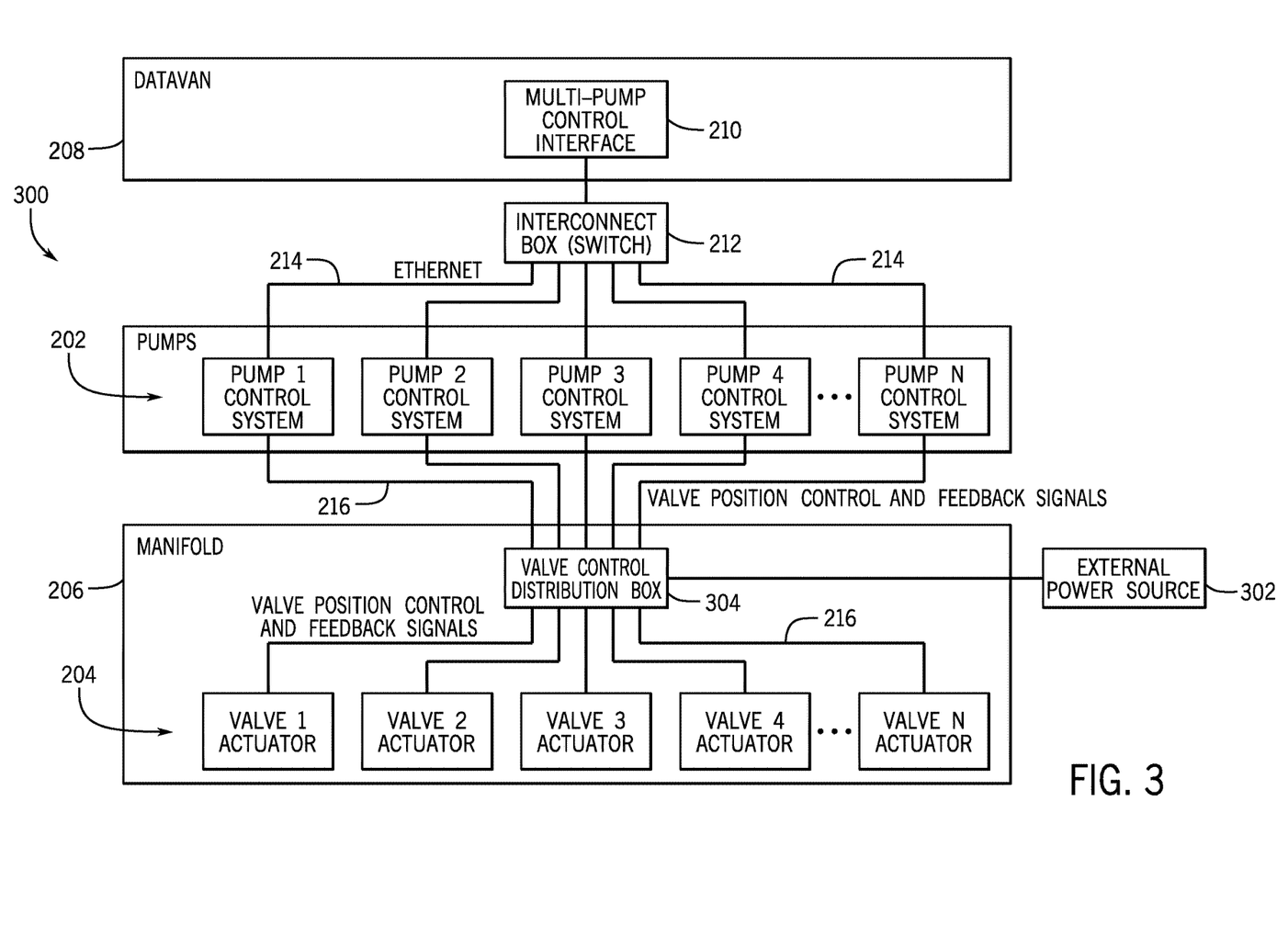
FIG. 3 is a schematic diagram of an embodiment of a pumping configuration using a valve control system, in accordance with embodiments of the present disclosure.

As described above, in various embodiments the power for operation of the valve actuators 204 is provided by the pumps 202. However, in certain embodiments, the pumps 202 may be incapable of providing sufficient operating energy. For example, very large actuators or actuators configured to open/close very quickly may have larger power requirements that may exceed the capabilities of the pumps 202. FIG. 3 is a schematic diagram of an embodiment of a pumping configuration 300 that shares various components with FIGS. 2A and 2B, which will not be repeated here for conciseness. As shown this example, the configuration 300 includes an external power source 302 that is coupled to a valve control distribution box 304 (e.g., distribution box, control box) that is also mounted to and/or associated with the manifold 206.

In various embodiments, the power control signal from the pumps 202 may be insufficient to provide operational power to the valve actuators 204 and the valve control distribution box 304 may be utilized to receive the signal from the pump and then boost the signal using the external power source 302. It should be appreciated that "boosting" the signal may include sending a second signal that utilizes the high power provided by the external power source 302 and is not necessary a continuation or addition to the original signal received from the pumps 202.

In the illustrated example, the connections 214 extend between the interconnect box 212 and the pumps 202. Moreover, the interconnect box 212 is communicatively coupled to the data van 208 (e.g., the control interface 210). These connections 214 may be Ethernet communication connections, in various embodiments, but it should be appreciated that embodiments are not limited to only Ethernet communication. Furthermore, the location of the interconnect box 212 is shown for illustrative purposes and may be associated with the manifold 206, as shown in FIG. 2B.

The illustrated pumps 202 are coupled, via the connections 216, to the valve control distribution box 304, which may then relay the control signals to the valve actuators 204 and/or transmit information to the pumps 202. The external power source may provide sufficient operational energy for the valve actuators 204, thereby enabling remote actuation from the data van 308 even when the power supplied by the pumps 202 is insufficient for control operations.

As noted above, the illustrated valve control distribution box 304 is arranged at a central location on the manifold 206, but it should be appreciated that the valve control distribution box 304 may be arranged in other locations along the manifold 206, and in embodiments, may be distributed throughout the manifold 206 at each valve actuator location. Electrical power sources may include any acceptable mode of power generation, including a standalone generators and the like. Alternatively, the valves can be pneumatically or hydraulically controlled, in which case an air compressor or hydraulic system could provide the operational energy.

It should be appreciated that the illustrated external power source 302 may not be the only power source provided to the valve actuators 204. For example, the valve actuators 204 may include battery backup systems in the event of a power failure or the like. Accordingly, operation of the valves may continue even if power is lost.

Figure 4A:
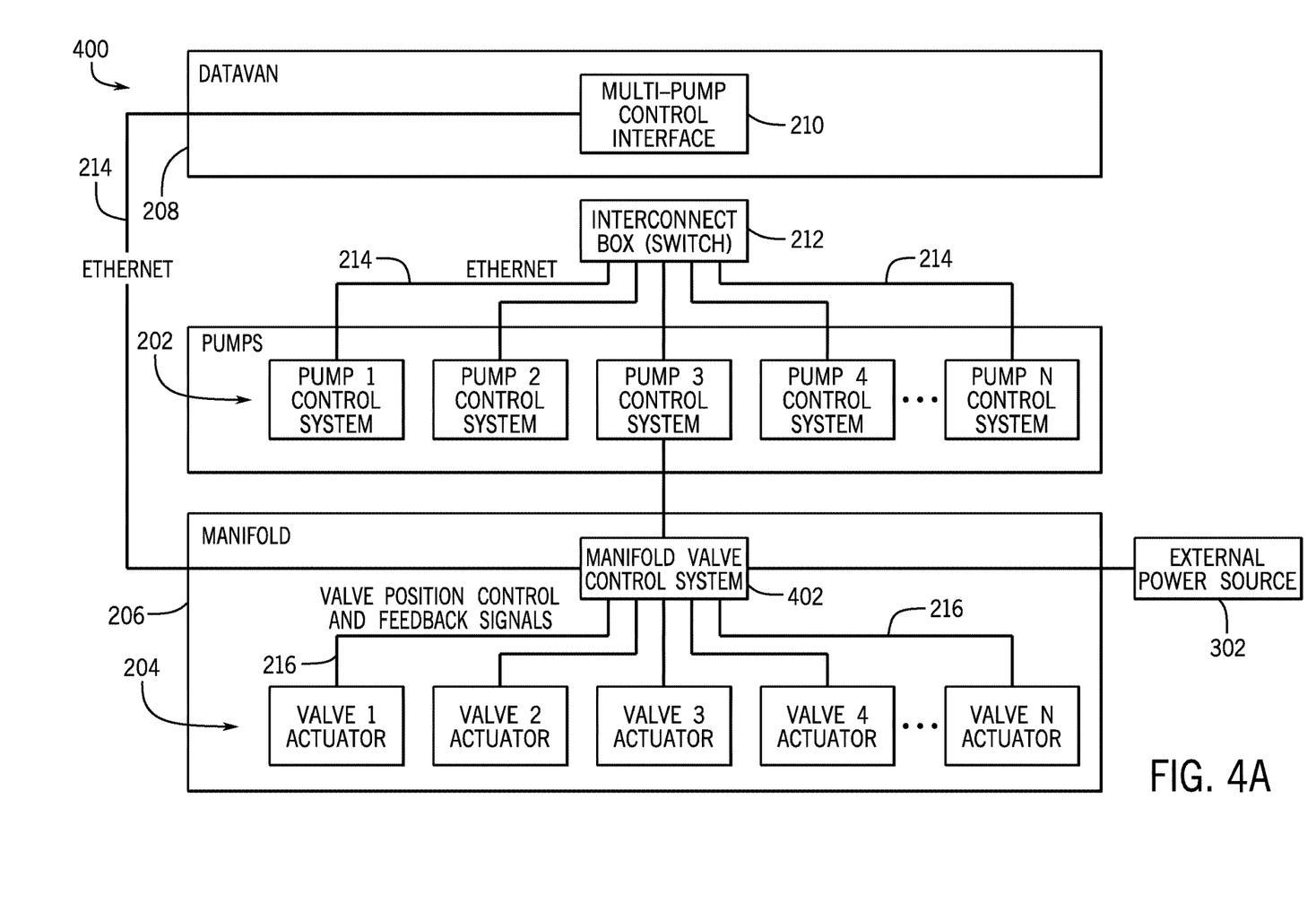
FIG. 4A is a schematic diagram of an embodiment of a pumping configuration using a valve control system, in accordance with embodiments of the present disclosure.

FIG. 4A is a schematic diagram of an embodiment of a pumping configuration 400 in which the control interface 210 is directly coupled to a manifold valve control system 402. This configuration enables direct communication between the control interface 210 and the valve control system 402 via the connection 214, thereby bypassing control through the pumps 202 as shown in the previous configurations. This example includes the external power source 302 providing operational energy to the manifold valve control system 402, and subsequently, to the valve actuators 204 receiving the control signals from the manifold valve control system 402 via the connections 216. Advantageously, the number of cables between the pumps and manifold may be reduced. It should be appreciated that additional monitoring information may be provided to ensure the pumps and valves remain in-sync during operation.

Figure 4B:
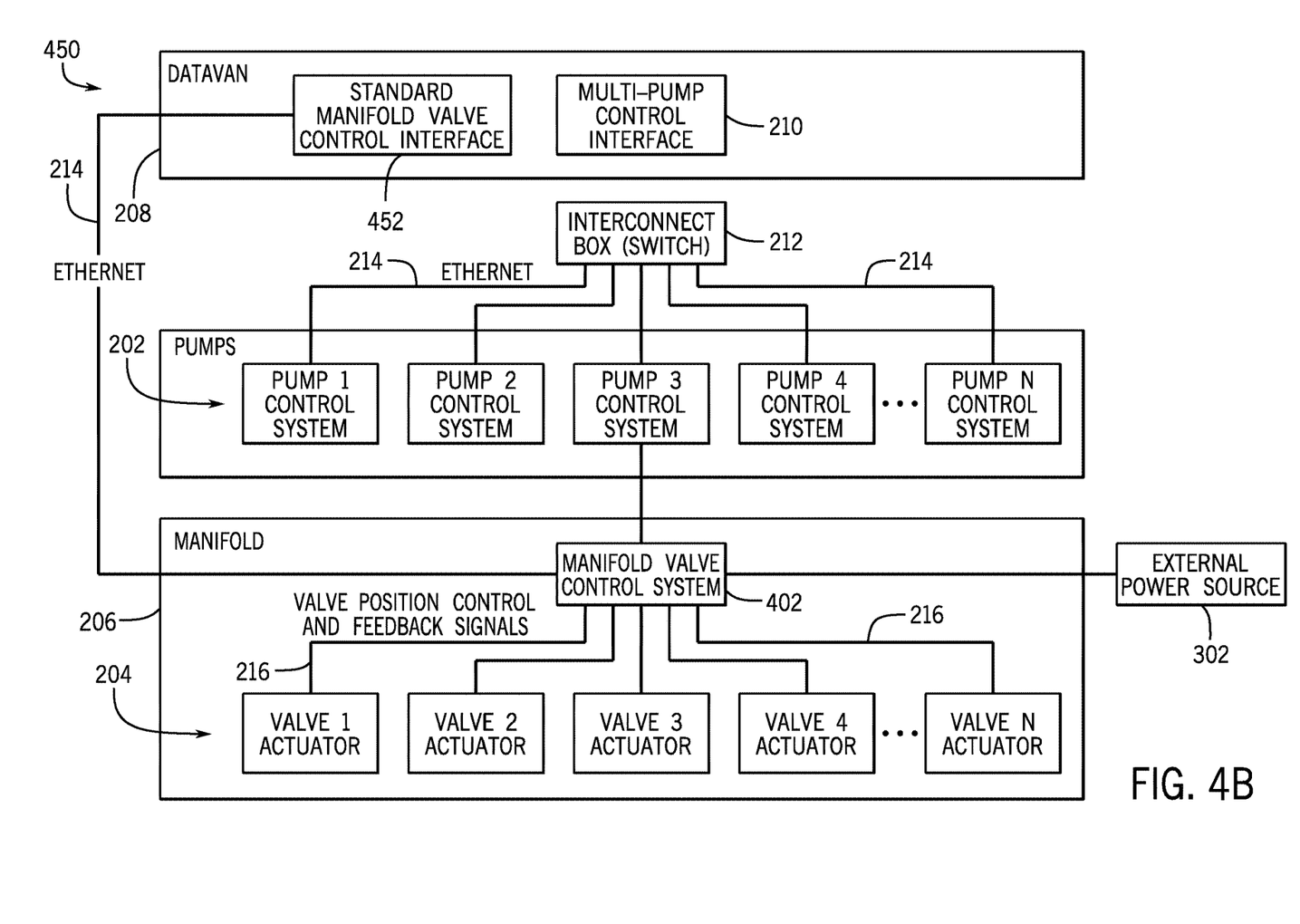
FIG. 4B is a schematic diagram of an embodiment of a pumping configuration using a valve control system, in accordance with embodiments of the present disclosure.

FIG. 4B is a schematic diagram of an embodiment of a pumping configuration 450 in which a standalone manifold valve control interface 452 is directly coupled to the manifold valve control system 402. This configuration enables direct communication between the control interface 452 and the valve control system 402 via the connection 214, thereby bypassing control through the pumps 202 as shown in the previous configurations. This example includes the external power source 302 providing operational energy to the manifold valve control system 402, and subsequently, to the valve actuators 204 receiving the control signals from the manifold valve control system 402 via the connections 216. Additionally, as opposed to FIG. 4A, the configuration 450 does not utilize the same interface as the pumping control interface 210. Having a separate interface may enable a less cluttered screen that may provide additional information to the operators.

Figure 5:
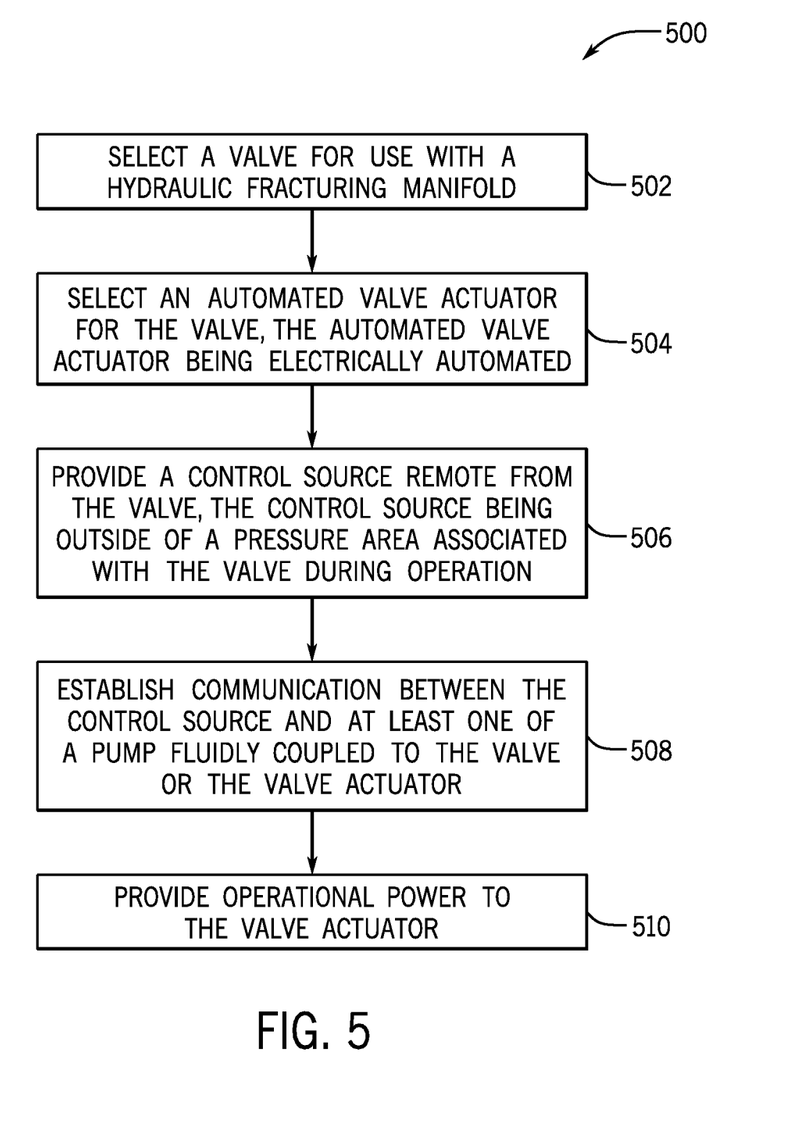
FIG. 5 is a flow chart of an embodiment of a method for providing a valve control system, in accordance with embodiments of the present disclosure.

FIG. 5 is a flow chart of an embodiment of a method 500 for providing remote valve operations. It should be appreciated that for this method and all methods described herein that there may be more or fewer steps. Additionally, the steps may be performed in any order, or in parallel, unless otherwise specifically stated. In this example, a valve is selected for use with a hydraulic fracturing manifold 502. The valve may be selected based on a number of factors, such as flow rate capability, materials of construction, longevity, torque requirements, and the like. The valve may include an automated valve actuator 504, which may be configured for manual override. In various embodiments, the automated valve actuator is an electric actuator that may receive one or more control or power signals to move a valve from an open position to a closed position, and to positions in between. A control source may be provided to send one or more control signals to the automated valve actuator 506. The control source may be arranged remote from the valve actuator, such as outside of a pressure zone that may have entry restrictions during fracturing operations. In embodiments, communications are established between the control source and the valve actuator 508. For example, the control source may directly communicative with the valve actuators.

In other embodiments, intermediate equipment such as valve control systems and/or pumps may receive the control signals and transmit the signals to the valve actuator. Thereafter, operation power may be provided to control the valve actuators 510. By way of example, an external power source may be provided proximate the valve actuators. Moreover, in certain embodiments, the pumps or intermediate components may provide the operational power. In this manner, fracturing operations can be controlled remotely via actuation and control of the various valves.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

We claim:

1. A hydraulic fracturing valve control system comprising:
    an electric powered, multi-plunger hydraulic fracturing pump;
    a manifold coupled to a discharge side of the electric powered, multi-plunger hydraulic fracturing pump;
    a valve forming at least a portion of the manifold, the valve being operable to between an open position, a closed position, and a plurality of intermediate positions;
    a valve actuator, coupled to the valve, the valve actuator being an electric actuator that is remotely controllable in response to one or more operational aspects of the electric powered, multi-plunger hydraulic fracturing pump;
    a valve control distribution box, arranged at the manifold, configured to receive control signals from the electric powered, multi-plunger hydraulic fracturing pump, the valve control distribution box relaying the control signals to the valve actuator; and
    a control interface, the control interface forming at least a portion of a control system, the control interface being accessible from a location remote from the electric powered, multi-plunger hydraulic fracturing pump and outside of a zone of pressure formed by the electric powered, multi-plunger hydraulic fracturing pump during operation.

2. The hydraulic fracturing valve control system of claim 1, further comprising:
    an interconnect box configured to receive a control signal from the control interface and to relay the control signal to the electric powered, multi-plunger hydraulic fracturing pump.

3. The hydraulic fracturing valve control system of claim 2, wherein the interconnect box is arranged at a data van or the manifold.

4. The hydraulic fracturing valve control system of claim 2, wherein an Ethernet connection extends between the interconnect box and the electric powered, multi-plunger hydraulic fracturing pump.

5. The hydraulic fracturing valve control system of claim 1, further comprising:
    an external power source, the external power source providing operational power to the valve actuator in response to a control signal from the control interface.

6. The hydraulic fracturing valve control system of claim 1, wherein operational power for the valve actuator is provided via the electric powered, multi-plunger hydraulic fracturing pump.

7. The hydraulic fracturing valve control system of claim 1, further comprising:
    a battery backup electrically coupled to the valve actuator, the battery backup providing operational energy to the valve actuator.

8. A hydraulic fracturing valve control system comprising:
    a plurality of electric powered, multi-plunger hydraulic fracturing pumps;
    a manifold coupled to a discharge side of the plurality of electric powered, multi-plunger hydraulic fracturing pumps;
    a plurality of valves forming at least a portion of the manifold, each valve of the plurality, of valves being operable to move between an open position, a closed position, and a plurality of intermediate positions;
    a plurality of valve actuators, coupled to respective valves of the plurality of valves, each of the valve actuators being electric actuators configured to be remotely controllable in response to one or more operational aspects of at least one electric powered; multi-plunger hydraulic fracturing pump of the plurality of electric powered, multi-plunger hydraulic fracturing pumps;
    a valve control distribution box, arranged at the manifold, configured to receive control signals from the plurality of electric powered, multi-plunger hydraulic fracturing pumps, the valve control distribution box relaying the control signals to the plurality of valve actuators; and
    a control interface, the control interface forming at least a portion of a control system, the control interface being accessible from a location remote from the plurality of electric powered, multi-plunger hydraulic fracturing pumps and outside of a zone of pressure formed by the plurality of electric powered, multi-plunger hydraulic fracturing pumps during operation.

9. The hydraulic fracturing valve control system of claim 8, wherein a first electric powered, multi-plunger hydraulic fracturing pump of the plurality of electric powered, multi-plunger hydraulic fracturing pumps is coupled to the control interface via a first connection and the first electric powered, multi-plunger hydraulic fracturing pump of the plurality of electric powered, multi-plunger hydraulic fracturing pumps is coupled to a first valve actuator of the plurality of valve actuators via a second connection, different from the first connection.

10. The hydraulic fracturing valve control system of claim 8, further comprising:
    an external power source, the external power source providing operational power to at least one valve actuator of the plurality of valve actuators in response to a control signal from the control interface.

11. The hydraulic fracturing valve control system of claim 8, further comprising:
    a battery backup electrically coupled to at least one valve actuator of the plurality of valve actuators, the battery backup providing operational energy to the at least one valve actuator.

12. The hydraulic fracturing valve control system of claim 8, wherein a first electric powered, multi-plunger hydraulic fracturing pump of the plurality of electric powered, multi-plunger hydraulic fracturing pump is configured, via an Ethernet connection, a control signal and, responsive to the control signal, transmit, via a second connection different from the Ethernet connection, a valve control signal to adjust a position of a first valve actuator of the plurality of valve actuators during fracturing operations.

13. The hydraulic fracturing valve control system of claim 8, wherein the control interface is positioned within a data van, the control interface providing a graphical representation of a valve position.

14. A hydraulic fracturing valve control system, comprising:
   an electric powered, multi-plunger hydraulic fracturing pump;
   a manifold coupled to the electric powered, multi-plunger hydraulic fracturing pump;
   a valve associated with the manifold, the valve being operable to move between an open position, a closed position, and a plurality of intermediate positions;
   a valve actuator; coupled to the valve, the valve actuator being an electric actuator that is remotely controllable in response to one or more operational aspects of the electric powered, multi-plunger hydraulic fracturing pump;
   a valve control distribution box, arranged at the manifold, configured to receive control signals from the electric powered, multi-plunger hydraulic fracturing pump, the valve control distribution box relaying the control signals to the valve actuator; and
   a control interface, the control interface forming at least a portion of a control system, the control interface being accessible from a location remote from the electric powered, multi-plunger hydraulic fracturing pump and outside of a zone of pressure formed by the electric powered, multi-plunger hydraulic fracturing pump during operation.

15. The hydraulic fracturing valve control system of claim 14, further comprising:
   an interconnect box configured to receive a control signal from the control interface and to relay the control signal to the electric powered, multi-plunger hydraulic fracturing pump.

16. The hydraulic fracturing valve control system of claim 15, wherein the interconnect box is arranged at a data van or the manifold.

17. The hydraulic fracturing valve control system of claim 15, wherein an Ethernet connection extends between the interconnect box and the electric powered, multi-plunger hydraulic fracturing pump.

18. The hydraulic fracturing valve control system of claim 14, further comprising:
   an external power source, the external power source providing operational power to the valve actuator in response to a control signal from the control interface.

19. The hydraulic fracturing valve control system of claim 14, wherein operational power for the valve actuator is provided via the electric powered, multi-plunger hydraulic fracturing pump.

* * * * *